Figure 1:
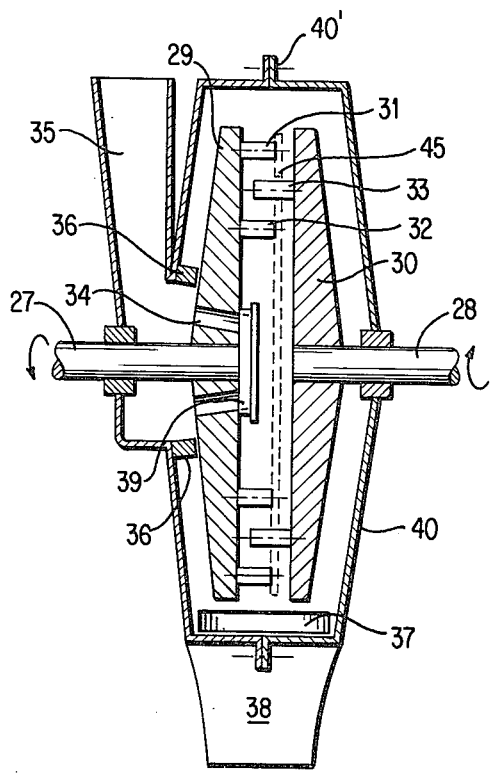

United States Patent [19]

Entzmann

[11] 4,323,448
[45] Apr. 6, 1982

[54] PROCESS FOR ACTIVATING TREATMENT OF CRUDE OIL

[75] Inventor: Karl Entzmann, St. Kathrein am Hauenstein, Austria

[73] Assignee: Simmering-Graz-Pauker Aktiengesellschaft fur Maschinen-, Kessel-und Waggonbau, Vienna, Austria

[21] Appl. No.: 131,426

[22] Filed: Mar. 18, 1980

[30] Foreign Application Priority Data

Mar. 19, 1979 [AT] Austria .................. 2039/79

[51] Int. Cl.³ .................. C10G 7/00; C10G 71/00
[52] U.S. Cl. .................. 208/85; 208/347; 208/370
[58] Field of Search .................. 208/85, 370, 347

[56] References Cited

U.S. PATENT DOCUMENTS

| | | | |
|---|---|---|---|
| 1,724,072 | 8/1929 | Daniels . | |
| 1,956,603 | 5/1934 | White | 208/85 |
| 2,333,104 | 11/1943 | Hopkins | 208/370 |
| 2,623,700 | 12/1952 | Scherer . | |
| 2,698,284 | 12/1954 | Adams | 208/85 |
| 3,972,724 | 8/1976 | Entzmann . | |

Primary Examiner—T. Tufariello
Attorney, Agent, or Firm—Fleit & Jacobson

[57] ABSTRACT

A process for mechanochemically activating treatment of crude oil from petroleum and of hydrocarbon mixtures like crude oil but of different, e.g. synthetic origins, is characterized in that the crude oil or similar, if need be after separation of the usual additional water, salts, insoluble impurities, washable acids or compounds with acid reactions, and expulsion of dissolved gaseous components, is treated in a pinned-disk or cage mill known as a "disintegrator" such that every single droplet of oil is exposed on a statistical average to 3 to 12 beats during a period of 0.001 to 0.01 seconds. Improved properties are thus imparted to the products, affecting both processing and the use of the processed products.

12 Claims, 2 Drawing Figures

PROCESS FOR ACTIVATING TREATMENT OF CRUDE OIL

The present invention concerns a process for activating treatment of crude oil.

Various processes are known with whose aid substances or mixtures of substances can be brought into so-called "mechanochemically activated" states through the introduction of mechanical energy, i.e. they are given an energy content significantly in excess of that due to thermal movement or surface energy. When solids are treated in this way, the "mechanochemical activation" which becomes apparent in their chemical and/or physico-chemical behaviour after treatment is attributed to changes brought about in the microstructure of the substances concerned, e.g. to disturbances in the lattice or changes in the molecular, atomic and in some circumstances even sub-atomic (e.g. electronic) structure.

In the case of liquids, there is not as yet any satisfactory theory or even hypothesis to explain the changes also observed here, so it is hardly possible to make any predictions here.

Now, in accordance with the invention, crude oil (from petroleum) or hydrocarbon mixtures comparable with crude oil but of different, even synthetic origin are subjected to a mechanochemical activation treatment of the kind described. In fact it has been found that totally surprising and unpredictable improvements in properties are imparted to the named products by such a treatment, affecting both processing and the use of the processed products.

For example, when processing crude oil or a similar mixture of hydrocarbons by distillation, starting materials treated in accordance with the invention yield more fractions rich in hydrogen, i.e. light to medium fractions, and less heavy fractions (short on hydrogen) then untreated starting materials.

Similarly, when starting materials treated in accordance with the invention are subjected to thermal cracking processes, comparably more light and less heavy fractions are obtained.

Oxidation processes to which crude oil products are sometimes subjected, e.g. for the production of fatty acids or other end-products containing oxygen, take place faster and more completely when starting materials treated in accordance with the invention are used.

Isomerization which may be carried out with hydrocarbon mixtures treated in accordance with the invention tends to give products with fairly high levels of branching with moderate chain lengths, which is also highly desirable for the production of knock-free fuels for example.

This list of advantageous effects which can be obtained through the process in accordance with the invention is only given by way of example, however, and is in no way exhaustive or complete.

Essentially, the process consists in treating the crude oil in so-called disintegrators. For this treatment, the crude oil is first separated in a manner known per se from emulsified water and substances dissolved therein, preferably salts, freed of acids, sulphur and the like which can be removed easily, and then fed into the disintegrator. Disintegrators within the meaning of the present invention are known pinned-disk or cage mills which differ primarily from pinned-disk and cage mills in general in their comparatively very high beating speeds. Whereas pinned-disk and cage mills used exclusively for comminuting material attain peripheral speeds at the outermost row of pins of around 40-50 m/s or speeds approaching 100 m/s in special cases, the disintegrators intended for crude oil activation run at peripheral speeds of 100 m/s and above this to more than 300 m/s, preferably up to 330 m/s.

Both pinned-disk and cage mills have a casing similar to that of a centrifugal pump, in which two parallel plates, the so-called rotors or grinding disks, rotate driven in opposite directions. On their facing sides, the rotors carry concentric rows of beating pins. Since the diameter of these rows increases in alternation between the rotors and the rotors run in opposite directions, neighbouring rows move in opposite directions at relative speeds which, for the two outermost rows, reach as much as double the values given above, i.e. may considerably surpass the speed of sound. Thus, the effective speeds for the beating of the particles forced through and therefore the specific energy levels imparted are also correspondingly high.

Pinned-disk and cage mills differ from one another in that in the first the ends of the pins remote from the disk carrying them remain exposed whereas in the cage mill type they are covered in rows with steel rings and are interconnected. The two designs differ essentially in their flow control, moreover cage mills also permit the use of irregularly shaped, e.g. spade-like beaters.

The number of beats which the droplets of oil receive depends on the number of rows of beaters on both rotors, the time within which the beats are administered, the speed of rotation of the rotors, the diameters of the innermost and outermost row of beaters, the number of rows and the differences in diameter, and also to some extent on the form of the beater and the strength of the flow of gas passing through the machine (caused by the pumping action of the rotors). So, with this type of machine it is appropriate to talk of, for example, 3 to 12 beats within 0.001 and 0.01 seconds, since this can be controlled by the form of the machine and its running speed.

The advantageous properties or changes found on processing and described previously can be obtained for example with a crude oil that has been treated in such disintegrators exhibiting at least three and preferably no more than twelve rows of beating pins and running with rotor periphery speeds of more than 100 m/s and preferably 200 to 330 m/s.

An embodiment of a disintegrator or modified pinned-disk mill is shown in the drawing.

FIG. 1 shows a cross-section through the disintegrator and

Figure 2:
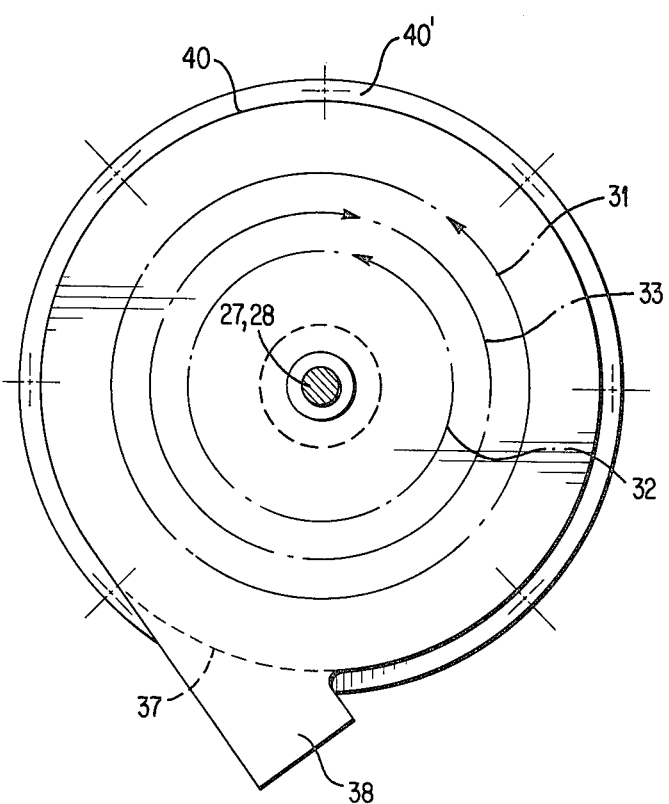

FIG. 2 a diagrammatic side view of the same with the front end of the casing removed.

In this pinned-disk mill ("disintegrator") two shafts 27 and 28 with their axes aligned each carry a grinding disk 29 and 30 at the end.

Near the centre of the disk, one of these grinding disks has openings 34 for passage of the material to be treated. A deflecting and guiding plate 39 is located in front of these openings. Facing the openings 34 there is the chamber 35 through which the material to be treated is fed in. Sealing rings 36 prevent this material on the outside of the grinding disk 29 from bypassing the grinding and beating pins in the rows 31, 32 and 33 and passing into the discharge chamber 38 through the discharge opening 37.

The grinding disks are enclosed in a casing 40 which can be opened along the flange 40'.

It is indicated in the drawing that the beating pins contra-rotate in alternation. This produces very high beating speeds.

Devices of the kind described have been known for a long time. A common feature of most of them is for the beating pins to be cylindrical in cross-section, resulting in considerable directional scattering of the particles accelerated by them. However, different cross-sections can also be used, e.g. oval or angular.

A cage mill has a ring-shaped plate 45 over all or certain individual rows of pins, as shown by the dotted lines in FIG. 1 for the left-hand outermost row of pins. Such a small plate covers the ends of the pins.

EXAMPLES

1. A multi-basic paraffinic crude oil was evaporated at 372° C. and fractionated with a head temperature of 187° C., once in the conventional manner and once after prior treatment in a disintegrator with contrarotating disks with peripheral speeds of 155 and 147 m/s. The following results were observed:

| Fraction | without disintegrator | with disintegrator | Difference |
|---|---|---|---|
| Petrol | 21.2% | 22.0% | +0.8% |
| Kerosene | 5.9% | 6.0% | +0.1% |
| Gas oil | 25.8% | 25.9% | +0.1% |
| Total | 52.9% | 53.9% | +1.0% (+1.9% relative) |

2. A multi-basic crude oil was evaporated at 375° C. and fractionated with a head temperature of 184° C., once without treatment in a disintegrator, once with when the contrarotating disks had peripheral speeds of 165 and 138 m/s. The following results were observed:

| Fraction | without disintegrator | with disintegrator | Difference |
|---|---|---|---|
| Petrol | 34.6% | 35.6% | +1.0% |
| Kerosene | 13.7% | 14.0% | +0.3% |
| Gas oil | 18.2% | 18.1% | −0.1% |
| Total | 66.5% | 67.7% | +1.2% (+1.9% relative) |

3. A paraffinic debituminized head residue was catalytically cracked with a catalyst of the wide-pored mordenite type, the conversion rate was 61.7%, the petrol fraction was 48.6%. When the head residue was treated in a disintegrator first with the disks contrarotating at peripheral speeds of 188 and 132 m/s, with conditions otherwise the same the relative increase for the conversion rate was 2.4% giving 63.2% and that for the petrol fraction was 3.5% giving 50.3%. The ROZ (octane rating) rose from 88.4 to 90.3. The effect of TEL additives on the octane rating remained the same.

4. Acidic primary distillate was fed, together with the calculated quantity of lime water, into a disintegrator whose contrarotating rotors ran with peripheral speeds of 124 m/s and 103 m/s. No further mixing took place. The mixture was passed straight to the furnace and redistilled, the redistillates were acid-free.

I claim:

1. A process for mechanochemically activating a liquid hydrocarbon comprising the steps of:
   passing said hydrocarbon to a disintegrator comprising a pair of counter-rotable disks having alternate concentric rows of beating pins;
   subjecting said hydrocarbon to intense mechanical beating by contacting said hydrocarbon with said beating pins, whereby said hydrocarbon is subjected to a statistical average of between about 3 to 12 beats during a period between about 0.001 to 0.01 seconds; and
   recovering a mechanochemically activated hydrocarbon.

2. A process as in claim 1, characterised in that the rotors of the disintegrator are driven with peripheral speeds of 100 to 330 m/sec.

3. A process as in claim 1 or 2, characterised in that the treatment takes place under inert gas.

4. The process of claim 1, wherein the activated hydrocarbon is further subjected to a processing step.

5. The process of claim 4, wherein the processing step is distillation.

6. The process of claim 4, wherein the processing step is thermal cracking.

7. The process of claim 4, wherein the processing step is oxidation.

8. The process of claim 4, wherein the processing step is isomerization.

9. The process of claims 1, 4, 5, 6, 7 or 8, wherein the liquid hydrocarbon is selected from the group consisting essentially of crude oil, synthetic crude oil, and mixtures thereof.

10. The process of claim 1, wherein the disintegrator has between 3 to 12 rows of beating pins driven at peripheral speeds greater than 100 m/sec.

11. The process of claim 10, wherein the peripheral speed is between 200 to 330 m/sec.

12. The process of claim 1, wherein the hydrocarbon is pretreated to remove impurities.

* * * * *